US012540903B2

United States Patent
Babasaki et al.

(10) Patent No.: US 12,540,903 B2
(45) Date of Patent: Feb. 3, 2026

(54) PINHOLE DETECTION DEVICE

(71) Applicant: TOYO KOHAN CO., LTD., Tokyo (JP)

(72) Inventors: Ryou Babasaki, Kudamatsu (JP); Kaoru Imashige, Kudamatsu (JP); Katsunari Miyake, Kudamatsu (JP)

(73) Assignee: TOYO KOHAN CO., LTD., Tokyo (JP)

( * ) Notice: Subject to any disclaimer, the term of this patent is extended or adjusted under 35 U.S.C. 154(b) by 51 days.

(21) Appl. No.: 18/557,688

(22) PCT Filed: Mar. 31, 2022

(86) PCT No.: PCT/JP2022/016408
§ 371 (c)(1),
(2) Date: Oct. 27, 2023

(87) PCT Pub. No.: WO2022/239568
PCT Pub. Date: Nov. 17, 2022

(65) Prior Publication Data
US 2024/0210327 A1    Jun. 27, 2024

(30) Foreign Application Priority Data
May 10, 2021    (JP) ................. 2021-079607

(51) Int. Cl.
*G01N 21/86*    (2006.01)

(52) U.S. Cl.
CPC ..... *G01N 21/86* (2013.01); *G01N 2021/8636* (2013.01); *G01N 2021/8645* (2013.01)

(58) Field of Classification Search
CPC ......... G01N 2021/6441; G01N 21/648; G01N 2021/6419; G01N 21/6454;
(Continued)

(56) References Cited

U.S. PATENT DOCUMENTS

| | | | |
|---|---|---|---|
| 4,559,451 A | 12/1985 | Curl | |
| 2010/0296096 A1* | 11/2010 | Horvath | G01N 21/8422 356/446 |

FOREIGN PATENT DOCUMENTS

| | | | |
|---|---|---|---|
| CN | 206497055 U | * | 9/2017 |
| JP | S5034586 A | | 4/1975 |

(Continued)

OTHER PUBLICATIONS

International Search Report for Corresponding International Application No. PCT/JP2022/016408, 3 pages, May 31, 2022.

*Primary Examiner* — Michael P Stafira
(74) *Attorney, Agent, or Firm* — Lucas & Mercanti, LLP

(57) ABSTRACT

The problem solved by the present invention is to provide a pinhole detection device with an improved accuracy of detecting pinholes. The detection unit of the pinhole detection device includes a plurality of optical fibers that transmit light that has passed through the object to be inspected. The plurality of optical fibers are arranged side by side while facing a light source. When a maximum detectable angle at which the pinhole with respect to an optical axis of the light source is detectable is defined as θ, a maximum angle of incidence of light that can be transmitted by the optical fiber with respect to the optical axis of the light source is set in a range of θ+0° to θ+5°.

4 Claims, 2 Drawing Sheets

(58) Field of Classification Search
CPC ....... G01N 21/6428; G01N 2021/6439; G01N 2201/12; G01N 2021/6421; G01N 2201/08; G01N 2021/6463; G01N 2021/6471; G01N 21/6408; G01N 2201/064; G01N 2201/0696; G01N 21/6486; G01N 21/6456; G01N 2223/419; G01N 2223/505; G01N 23/046; G01N 2021/4747; G01N 2223/108; G01N 23/2255; G01N 21/645; G01N 21/6452; G01N 2021/6478; G01N 21/64; G01N 21/7743; G01N 21/7746; G01N 2201/02; G01N 2201/06113; G01N 2201/0612; G01N 2201/062; G01N 2201/068; G01N 2201/125; G01N 21/55; G01N 21/8806; G01N 15/1459; G01N 2021/8918; G01N 21/274; G01N 21/49; G01N 15/147; G01N 2015/016; G01N 2021/8848; G01N 2035/00158; G01N 2035/00356; G01N 2035/00366; G01N 2035/0097; G01N 21/3504; G01N 21/39; G01N 21/43; G01N 35/028; G01N 15/1436; G01N 2015/012; G01N 2015/018; G01N 2015/1019; G01N 2015/1479; G01N 2015/1493; G01N 2021/258; G01N 2021/399; G01N 2021/4709; G01N 2021/4711; G01N 2021/8829; G01N 2035/00316; G01N 21/05; G01N 21/171; G01N 21/21; G01N 21/25; G01N 21/253; G01N 21/4133; G01N 21/4738; G01N 21/553; G01N 21/554; G01N 21/59; G01N 21/658; G01N 21/88; G01N 21/9501; G01N 2201/0221; G01N 2201/0231; G01N 2201/061; G01N 2201/0691; G01N 2201/1281; G01N 25/18; G01N 27/129; G01N 29/2418; G01N 31/223; G01N 33/49; G01N 35/0098; G01N 35/02; G01N 35/026; G01N 1/00; G01N 1/38; G01N 1/44; G01N 15/0227; G01N 15/14; G01N 15/1429; G01N 15/1433; G01N 15/1434; G01N 2001/007; G01N 2001/382; G01N 2015/0038; G01N 2015/0053; G01N 2015/0233; G01N 2015/1006; G01N 2021/0112; G01N 2021/0346; G01N 2021/058; G01N 2021/7753; G01N 2021/7786; G01N 2021/8636; G01N 2021/8645; G01N 2021/8816; G01N 2021/8825; G01N 2021/8835; G01N 2021/8845; G01N 2021/8908; G01N 2021/8917; G01N 2035/00881; G01N 21/01; G01N 21/0303; G01N 21/0332; G01N 21/11; G01N 21/431; G01N 21/474; G01N 21/6458; G01N 21/77; G01N 21/86; G01N 21/8903; G01N 21/894; G01N 2201/021; G01N 2201/06166; G01N 2201/0638; G01N 2201/0833; G01N 33/28; G01N 33/2823; G01N 33/585; G01N 35/00; G01N 35/00871

See application file for complete search history.

(56) References Cited

FOREIGN PATENT DOCUMENTS

| | | | |
|---|---|---|---|
| JP | S5360284 | A | 5/1978 |
| JP | S55116256 | U | 8/1980 |
| JP | S58-135942 | A | 8/1983 |
| JP | S6125042 | A | 2/1986 |
| JP | H02107951 | A * | 4/1990 |
| JP | H09257720 | A * | 10/1997 |
| JP | 3176878 | B2 * | 6/2001 |
| JP | 2001188048 | A * | 7/2001 |
| JP | 2004325589 | A * | 11/2004 |
| JP | 2007171137 | A * | 7/2007 |
| JP | 2009139290 | A | 6/2009 |
| JP | 2010085609 | A * | 4/2010 |
| JP | 2010107408 | A * | 5/2010 |

* cited by examiner

PINHOLE DETECTION DEVICE

CROSS-REFERENCE TO RELATED APPLICATIONS

This application is a 371 of PCT/JP2022/016408, filed Mar. 31, 2022, which claims the benefit of Japanese Patent Application No. 2021-079607, filed May 10, 2021.

TECHNICAL FIELD

The present invention relates to a pinhole detection device.

BACKGROUND ART

Patent Literature 1 aims to provide a surface-defect examining device capable of accurately detecting a penetrated defect that is inclined in the thickness direction of a material to be examined (column 3, lines 10 to 13). To achieve this object, the surface-defect examining device of Patent Literature 1 includes a light source that emits light to the surface of the material to be examined, and a detection unit that detects the amount of transmitted light of the light emitted from the light source, in which an optical lens that forms the focal point on the detection unit is arranged between the material to be examined and the light source (column 3, lines 15 to 20, FIG. 1).

Patent Literature 2 aims to provide a pinhole detection device that detects an abnormal portion formed in a sheet-like object, such as a pinhole obliquely extending with respect to the surface of the sheet-like object (column 2, line 19 to column 3, line 2). To achieve this object, the sheet-like object abnormal portion detection device of Patent Literature 2 includes a laser light source, a lens that disperses a laser beam from the laser light source and changes the laser beam to a dispersed beam, a sheet-like object placed such that the dispersed beam is incident from one side of the sheet-like object, and a photosensitive means disposed so as to be responsive to transmitted light of the dispersed beam on the other side of the sheet-like object (the claims). The photosensitive means includes a photoconductor FO, such as fiber optics, and a photoelectric conversion element PH (column 4, lines 12 to 14, the drawings).

Patent Literature 3 aims to provide a pinhole detection device that detects a pinhole in a sheet material with high detection accuracy (page 4, lines 7 to 8). To achieve this object, in the sheet material pinhole detection device of Patent Literature 3, light is emitted from one side of a scanning sheet material, and on the other side of the sheet material, light passed through a pinhole in the sheet material is received on an end face of light transmitting fibers arrayed at right angles with respect to the scanning direction of the sheet material, and the light is guided to a photodetector through the light transmitting fibers, in which light-receiving ends of the light transmitting fibers are arranged in a plurality of rows in trefoil formation (claim 1, FIG. 4 to FIG. 6).

CITATION LIST

Patent Literature

Patent Literature 1: JP S61-025042 A
Patent Literature 2: JP S50-034586 A
Patent Literature 3: JP S55-116256 U

SUMMARY OF INVENTION

Technical Problem

Although Patent Literature 1 states that the detection unit (3) detects the amount of transmitted light of the emitted light (column 3, lines 16 to 17, etc.), Patent Literature 1 does not provide a description of the specific configuration of the detection unit (3). In addition, although Patent Literature 2 describes the photoconductor FO, such as fiber optics, and the photoelectric conversion element PH as the photosensitive means (column 4, lines 12 to 14, the drawings), Patent Literature 2 does not specifically study the specification of the photoconductor FO (optical fibers).

Furthermore, although Patent Literature 3 discloses the cross-sectional shape and arrangement of the light transmitting fiber 7 (optical fiber) (page 3, lines 16 to 20, FIG. 4 to FIG. 6, etc.), Patent Literature 3 does not study the other specifications of the light transmitting fiber 7. Thus, there is room for improvement of the accuracy of detecting pinholes.

The present invention has been made in view of the above issue, and provides a pinhole detection device with an improved accuracy of detecting pinholes.

Solution to Problem

A pinhole detection device according to the present invention comprises:
a light source that emits light to an object to be inspected;
an optical lens disposed between the light source and the object to be inspected; and
a detection unit that detects light that has been converged by the optical lens and passed through a pinhole in the object to be inspected,
wherein the detection unit includes an optical fiber that transmits the light that has passed through the pinhole in the object to be inspected, and
wherein when a maximum detectable angle at which the pinhole with respect to an optical axis of the light source is detectable is defined as $\theta$, a maximum angle of incidence of light that can be transmitted by the optical fiber with respect to the optical axis of the light source is in a range of $\theta+0°$ to $\theta+5°$.

According to the present invention, a pinhole as a detection target can be surely detected and disturbance light (or leakage light) can be easily prevented from entering the optical fiber. Consequently, it is possible to increase the signal-to-noise ratio (S/N ratio) of the transmitted light and the disturbance light and improve the accuracy of detecting the pinhole. The present invention can be preferably used when the object to be inspected is in the form of a band, for example. In particular, when the object to be inspected is one extended in the conveying direction (for example, a steel sheet, an optically nontransparent film, or paper), an inclined pinhole tends to be generated. The present invention facilitates detection of a pinhole that is inclined in the conveying direction.

In the present invention, the light source may be a linear light source that linearly emits light to the object to be inspected. The optical lens may converge light from the light source that is spread in a direction of travel away from the optical axis of the light source such that the light comes closer to the optical axis of the light source. The detection unit may include a plurality of the optical fibers arranged side by side while facing the light source. When a maximum angle of polarization of the optical lens is defined as θ1, the maximum angle of polarization θ1 may be set larger than or equal to the maximum detectable angle θ.

In the present invention, when the maximum angle of polarization of the optical lens is defined as θ1, a maximum angle of incidence of the light that can be transmitted by each of the optical fibers with respect to the optical axis of the light source may be included in a range of θ1+0° to θ1+5°.

The present invention may include a conveyance device that moves the object to be inspected in a direction perpendicular to a longitudinal direction of the light source and orthogonal to the optical axis of the light source. An end face of the optical fiber facing the object to be inspected may be arranged at a focal position of the optical lens or may be arranged nearer to the object to be inspected than the focal position of the optical lens.

According to the present invention, a pinhole is easily detected even when the object to be inspected is being moved relative to the pinhole detection device. That is, when the end face of the optical fiber is arranged at the focal position of the optical lens, the detection unit detects the light transmitted through the pinhole with a significantly sharp rise, while a time for detecting the rise is relatively short. In contrast, when the end face of the optical fiber is arranged nearer to the object to be inspected than the focal position of the optical lens, the rise by the light transmitted through the pinhole detected by the detection unit is smaller than that in the former arrangement, while a time for detecting the rise is relatively long. Thus, even if a pinhole cannot be detected in the former arrangement (the arrangement at the focal position of the optical lens) due to the moving speed of the object to be inspected, a pinhole may be detected in the latter arrangement (the arrangement nearer to the object to be inspected than the focal position). Therefore, in the latter arrangement, it is possible to set a higher moving speed of the object to be inspected.

In both of the former arrangement and the latter arrangement, a standard for determining the presence or absence of a pinhole need be set. Different determination standards may be set between the former arrangement and the latter arrangement. The determination standard as used herein may include a signal strength of the detection unit, the number of data used for calculating a movement average, for example.

In the present invention, a first linear Fresnel lens and a second linear Fresnel lens may be provided between the light source and the detection unit, the first linear Fresnel lens being disposed nearer to the light source along a longitudinal direction of the light source, the second linear Fresnel lens being disposed nearer to the detection unit than the first linear Fresnel lens along the longitudinal direction of the light source. The first linear Fresnel lens may refract light from the light source into parallel light. As viewed in the longitudinal direction of the light source, the second linear Fresnel may refract the parallel light such that a maximum angle of polarization of light refracted by the second linear Fresnel lens is equal to or smaller than a maximum angle of incidence with respect to an end face of the optical fiber. According to the present invention, this produces parallel light between the first linear Fresnel lens and the second linear Fresnel lens, and thus facilitates adjustment of the distance between the two Fresnel lenses.

Advantageous Effects of Invention

According to the present invention, it is possible to improve the accuracy of detecting pinholes.

DESCRIPTION OF EMBODIMENTS

A. One Embodiment

A-1. Configuration (A-1-1. Overall Configuration)

Figure 1:
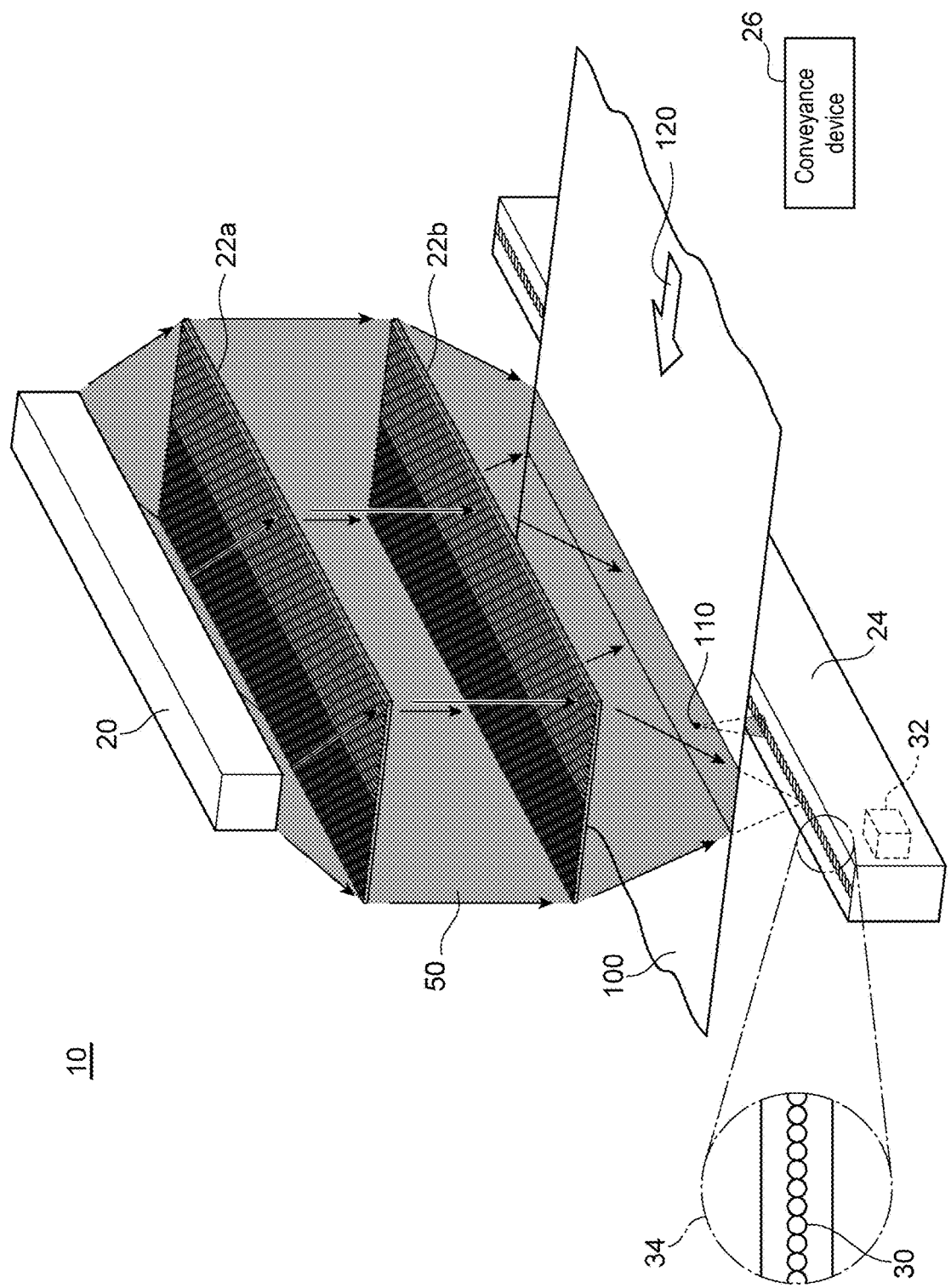
FIG. 1 is a perspective view schematically showing the configuration of a pinhole detection device according to one embodiment of the present invention.

FIG. 1 is a perspective view schematically showing the configuration of a pinhole detection device 10 according to one embodiment of the present invention. The pinhole detection device 10 detects a pinhole 110 generated in an object 100 to be inspected. The pinhole detection device 10 includes a light source 20, optical lenses 22a, 22b, a detection unit 24, and a conveyance device 26. The detection unit 24 includes a plurality of optical fibers 30, and at least one detection element 32. The object 100 to be inspected is conveyed in the direction of arrow 120 in FIG. 1 by the conveyance device 26.

(A-1-2. Light Source 20)

The light source 20 emits light 50 to the object 100 to be inspected. For example, the light source 20 is a linear light source including a plurality of lamps (not shown) arranged in a straight line form to linearly emit light to the object 100 to be inspected.

(A-1-3. Optical Lenses 22a, 22b)

As shown in FIG. 1, the optical lenses 22a, 22b are disposed between the light source 20 and the object 100 to be inspected. As viewed in the direction from the light source 20 to the detection unit 24 (downward in FIG. 1), the optical lenses 22a, 22b converge the light 50 from the light source 20 in a direction perpendicular to the longitudinal direction of the light source 20. That is, the optical lenses 22a, 22b converge the light from the light source 20 that is spread in a direction of travel away from the optical axis of the light source 20 such that the light comes closer to the optical axis of the light source 20.

The optical lens 22a is a first linear Fresnel lens (hereinafter also referred to as a "first linear Fresnel lens 22a" or a "first lens 22a") disposed nearer to the light source 20 than the optical lens 22b. The first lens 22a is disposed along the longitudinal direction of the light source 20 and refracts the light 50 from the light source 20 into parallel light. That is, the first lens 22a refracts the light from the light source 20 that is spread in a direction of travel away from the optical axis of the light source 20, and causes the light to be parallel to the optical axis.

The optical lens 22b is a second linear Fresnel lens (hereinafter also referred to as a "second linear Fresnel lens 22b" or a "second lens 22b") disposed nearer to the detection unit 24 than the first optical lens 22a. The second lens 22b is disposed along the longitudinal direction of the light source 20, and as viewed in the direction from the light source 20 to the detection unit 24 (downward in FIG. 1), converges the parallel light from the first lens 22a in a direction perpendicular to the longitudinal direction of the light source 20. That is, the second lens 22b converges the light parallel to the optical axis such that the light comes closer to the optical axis of the light source 20.

Figure 2:
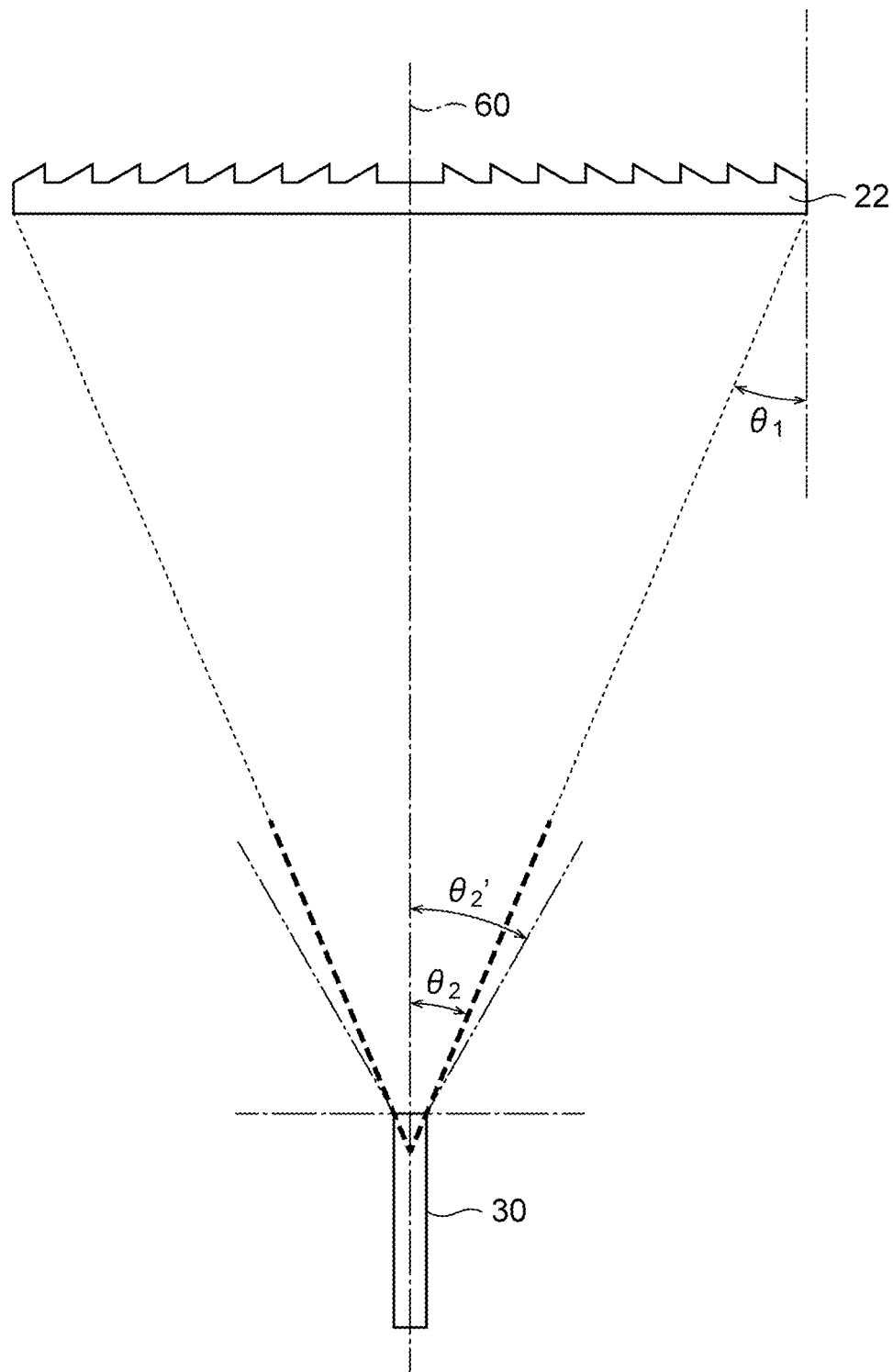
FIG. 2 is a view for explaining optical characteristics of an optical lens and an optical fiber of the embodiment.

FIG. 2 is a view for explaining optical characteristics of the optical lens 22b and the optical fiber 30 of the present embodiment. In FIG. 2, θ1 is a maximum angle of polarization of the light 50 refracted by the second lens 22b. θ2 is a maximum angle of incidence of the light 50 that can be transmitted by the optical fiber 30 with respect to an optical axis 60 of the light source 20. θ2' is an angle of θ2+5°. The second lens 22b refracts the parallel light such that the maximum angle of polarization θ1 of the light 50 refracted by the second lens 22b is equal to the maximum angle of incidence θ2 with respect to the end face of the optical fiber 30. Alternatively, the second lens 22b may refract the parallel light such that the maximum angle of polarization θ1 is smaller than the maximum angle of incidence θ2.

(A-1-4. Detection Unit 24)

The detection unit 24 detects the light 50 that has been converged by the optical lenses 22a, 22b and passed through the pinhole 110 in the object 100 to be inspected. In the present embodiment, since the light 50 is converged by the optical lenses 22a, 22b, the light 50 passes through an oblique pinhole 110 as well.

As shown in FIG. 1, the detection unit 24 includes a plurality of optical fibers 30, at least one detection element 32, and a pinhole determination portion (not shown). Each optical fiber 30 transmits the light 50 that has passed through the object 100 to be inspected to the detection element 32 (note that the light 50 having an angle of incidence larger than the maximum angle of incidence θ2 will not be transmitted by the optical fiber 30).

As shown in an enlarged portion 34 in FIG. 1, the optical fibers 30 are arranged in a straight line form along the longitudinal direction of the light source 20. The end face of the optical fiber 30 on the side adjacent to the object 100 to be inspected is arranged to be parallel to the optical lenses 22a, 22b and the object 100 to be inspected. Further, in the present embodiment, the end face (the upper end face in FIG. 1) of the optical fiber 30 facing the object 100 to be inspected is arranged at the focal position of the optical lens 22b.

The detection element 32 is an element that converts the light that has propagated through the optical fibers 30 into an electrical signal, and for example, a photomultiplier tube, CdS cells, and the like may be used. The pinhole determination portion determines the presence or absence of the pinhole 110 based on the output from the detection element 32. The pinhole determination portion may also be configured to be able to switch the settings of the standard for determining the pinhole 110 (a signal strength, the number of data used for calculating a movement average, and the like) in accordance with the type of object 100 to be inspected, a conveyance speed, and the like.

(A-1-5. Conveyance Device 26)

The conveyance device 26 moves the object 100 to be inspected in a direction perpendicular to the longitudinal direction of the light source 20 and orthogonal to the optical axis of the light source 20. The conveyance device 26 includes a roll or the like that is rotated by an electric motor (not shown) and conveys the object 100 to be inspected. As viewed in the direction from the light source 20 to the detection unit 24, the conveyance device 26 moves the object 100 to be inspected in the direction perpendicular to the longitudinal direction of the light source 20 (the direction of the arrow 120 in FIG. 1). Note that in the present embodiment, although the object 100 to be inspected is moved, the light source 20, the optical lenses 22a, 22b, and the detection unit 24 are fixed.

(A-1-6. Object 100 to be Inspected)

The object 100 to be inspected is in the form of a band, and may be, for example, a steel sheet, an optically non-transparent film, paper, and the like. The object 100 to be inspected may be one extended in the conveying direction (the direction of the arrow 120). When the object 100 to be inspected is a steel sheet, its width (the length in the direction perpendicular to the scanning direction) may be 50 cm to 1 m, for example.

A-2. Manufacturing Method (Design Method)

Next, a method of manufacturing (design method) the pinhole detection device 10 of the present embodiment will be described. In the present embodiment, the specification of each portion of the pinhole detection device 10 will be set in detail to improve the detection accuracy of the pinhole detection device 10. In one example, the following manufacturing method (design method) may be employed.

A manufacturer (designer) decides the maximum detectable angle θ of the pinhole 110 based on the thickness (a design value or a measured value) of the object 100 to be inspected and the hole diameter (an assumed value or a measured value in the past) of the pinhole 110. The maximum detectable angle θ is a maximum angle formed between the pinhole 110 as a detection target and the optical axis 60 (FIG. 2) of the light source 20 as viewed in the longitudinal direction of the light source 20. The maximum detectable angle θ is set to a small angle since the larger the thickness of the object 100 to be inspected and the smaller the hole diameter of the pinhole 110, oblique light 50 is less likely to pass through the pinhole 110.

Next, the manufacturer (designer) decides the maximum angle of incidence θ2 (FIG. 2) of the light 50 that can be transmitted by the optical fiber 30 with respect to the optical axis 60 of the light source 20. The maximum angle of incidence θ2 is in a range of the maximum detectable angle θ+0° to the maximum detectable angle θ+5°, for example. After deciding the maximum angle of incidence θ2, the manufacturer (designer) selects the specification of the optical fiber 30 achieving the maximum angle of incidence θ2. The maximum angle of incidence θ2 is substantially synonymous with the numerical aperture (NA), and varies depending on the material of the optical fiber 30, the refractive index of the core and the refractive index of the cladding, and the like. Thus, the manufacturer (designer) selects the optical fiber 30 achieving the maximum angle of incidence θ2.

Next, the manufacturer (designer) sets the specification of the light source 20 and the lenses 22a, 22b. For example, when the maximum angle of polarization of the optical lens 22b is defined as θ1 (FIG. 2), the manufacturer (designer) sets the maximum angle of polarization θ1 such that the maximum angle of incidence θ2 is included in a range of θ1+0° to θ1+5°.

A-3. Advantageous Effects of the Present Embodiment

According to the present embodiment, as viewed in the longitudinal direction of the light source 20 (linear light source), when the maximum detectable angle formed between the pinhole 110 as a detection target and the optical axis 60 of the light source 20 is defined as θ, the maximum angle of incidence θ2 of the light 50 that can be transmitted by the optical fiber 30 with respect to the optical axis 60 is set in a range of θ+0° to θ+5°. That is, when the maximum detectable angle at which the pinhole 110 with respect to the optical axis 60 of the light source 20 is detectable is defined as θ, the maximum angle of incidence of the light 50 that can be transmitted by the optical fiber 30 with respect to the optical axis 60 of the light source 20 is in a range of θ+0° to θ+5°. This allows the pinhole 110 as a detection target to be surely detected and easily prevents disturbance light (or leakage light) from entering the optical fiber 30. Consequently, it is possible to increase the signal-to-noise ratio (S/N ratio) of the transmitted light and the disturbance light and improve the accuracy of detecting the pinhole 110.

In the present embodiment, the light source 20 is a linear light source that linearly emits light to the object 100 to be inspected. The optical lenses 22a, 22b converge the light from the light source 20 that is spread in a direction of travel away from the optical axis of the light source 20 such that the light comes closer to the optical axis of the light source 20. The detection unit 24 includes the plurality of optical fibers 30 arranged side by side while facing the light source 20, and when the maximum angle of polarization of the optical lens 22b is defined as θ1, sets the maximum angle of polarization θ1 larger than or equal to the maximum detectable angle θ. This easily ensures the amount of light required for detecting the pinhole 110.

In the present embodiment, the end face of the optical fiber 30 facing the object 100 to be inspected is arranged at the focal position of the optical lens 22b (FIG. 1). Alternatively, the end face of the optical fiber 30 facing the object 100 to be inspected may be arranged nearer to the object 100 to be inspected than the focal position of the optical lens 22b. This allows the pinhole 110 to be easily detected even when the object 100 to be inspected is being moved relative to the pinhole detection device 10. That is, when the end face of the optical fiber 30 is arranged at the focal position of the optical lens 22b, the detection unit 24 detects the light transmitted through the pinhole 110 with a significantly sharp rise, while a time for detecting the rise is relatively short. In contrast, when the end face of the optical fiber 30 is arranged nearer to the object 100 to be inspected than the focal position of the optical lens 22b, the rise by the light transmitted through the pinhole 110 detected by the detection unit 24 is smaller than that in the former arrangement, while a time for detecting the rise is relatively long. Thus, even if the pinhole 110 cannot be detected in the former arrangement (the arrangement at the focal position of the optical lens 22b) due to the moving speed of the object 100 to be inspected, the pinhole 110 may be detected in the latter arrangement (the arrangement nearer to the object 100 to be inspected than the focal position). Therefore, in the latter arrangement, it is possible to set a higher moving speed of the object 100 to be inspected.

In the present embodiment, the conveyance device 26 moves the object 100 to be inspected in a direction perpendicular to the longitudinal direction of the light source 20 and orthogonal to the optical axis 60 of the light source 20 (the direction of the arrow 120) (FIG. 1). This allows a preferable use when the object 100 to be inspected is in the form of a band, for example. In particular, when the object 100 to be inspected is one extended in the conveying direction (for example, a steel sheet, an optically nontransparent film, paper, and the like), an inclined pinhole tends to be generated. The present embodiment facilitates detection of the pinhole 110 that is inclined in the conveying direction.

In the present embodiment, the first linear Fresnel lens 22a, which is disposed nearer to the light source 20 along the longitudinal direction of the light source 20, and the second linear Fresnel lens 22b, which is disposed nearer to the detection unit 24 than the first linear Fresnel lens 22a along the longitudinal direction of the light source 20, are provided between the light source 20 and the detection unit 24 (FIG. 1). The first linear Fresnel lens 22a refracts the light 50 from the light source 20 into parallel light (FIG. 1). The second linear Fresnel lens 22b refracts the parallel light such that the maximum angle of polarization θ1 of the light refracted by the optical lens 22b is equal to or smaller than the maximum angle of incidence θ2 with respect to the end face of the optical fiber 30 (FIG. 1 and FIG. 2). This produces parallel light between the first linear Fresnel lens 22a and the second linear Fresnel lens 22b, and thus facilitates adjustment of the distance between the two Fresnel lenses 22a, 22b.

B. Modification

It is needless to mention that the present invention is not limited to the above-described embodiment and may employ a variety of configurations based on the descriptions of this specification. For example, the present invention may employ the following configuration.

[B-1. Light Source]

In the above-described embodiment, the light source 20 is the linear light source (FIG. 1). However, the light source 20 may be other than the linear light source. In the above-described embodiment, one linear light source is used (FIG. 1). However, a plurality of light sources 20 may be used as shown in FIG. 5 of Patent Literature 1, for example. In the above-described embodiment, the light source 20 is disposed on the upper side and the detection unit 24 is disposed on the lower side. However, the positions of the light source 20 and the detection unit 24 may be opposite.

[B-2. Optical Lens]

In the above-described embodiment, the first linear Fresnel lens 22a and the second linear Fresnel lens 22b are used (FIG. 1). However, other lenses may be used.

[B-3. Detection Unit]

In the above-described embodiment, the optical fibers 30 are arranged in a straight line form (FIG. 1). However, the arrangement of the optical fibers 30 is not limited to this in view of the fact that the pinhole 110 is to be detected across the entire width (the length in the longitudinal direction of the light source 20) of the object 100 to be inspected, for example. The optical fibers 30 may be in the other arrangement, for example, may be displaced from each other in the longitudinal direction of the light source 20.

In the above-described embodiment, the end face of the optical fiber 30 facing the object 100 to be inspected is arranged nearer to the object 100 to be inspected than the focal position of the optical lens 22b (FIG. 1). However, the end face of the optical fiber 30 may be arranged at the focal position of the optical lens 22b depending on the conveyance speed of the object 100 to be inspected, and the like.

[B-4. Conveyance Device]

In the above-described embodiment, the conveyance device 26 is used to move the object 100 to be inspected (FIG. 1). However, the conveyance device 26 may not be provided when detection of the pinhole 110 is focused.

REFERENCE SIGNS LIST

10 Pinhole detection device
20 Light source (linear light source)

22a Optical lens (first linear Fresnel lens)
22b Optical lens (second linear Fresnel lens)
24 Detection unit
26 Conveyance device
30 Optical fiber
32 Detection element
50 Light
60 Optical axis
100 Object to be inspected
110 Pinhole
θ Maximum detectable angle
θ1 Maximum angle of polarization
θ2 Maximum angle of incidence

The invention claimed is:

1. A pinhole detection device comprising:
a light source that emits light to an object to be inspected;
an optical lens disposed between the light source and the object to be inspected; and
a detection unit that detects light that has been converged by the optical lens and passed through a pinhole in the object to be inspected,
wherein the detection unit includes an optical fiber that transmits the light that has passed through the pinhole in the object to be inspected,
wherein when a maximum detectable angle at which the pinhole with respect to an optical axis of the light source is detectable is defined as θ, a maximum angle of incidence of light that can be transmitted by the optical fiber with respect to the optical axis of the light source is in a range of θ+0° to θ+5°
wherein a first linear Fresnel lens and a second linear Fresnel lens are provided between the light source and the detection unit, the first linear Fresnel lens being disposed nearer to the light source along a longitudinal direction of the light source, the second linear Fresnel lens being disposed nearer to the detection unit than the first linear Fresnel lens along the longitudinal direction of the light source,
wherein the first linear Fresnel lens refracts light from the light source into parallel light, and
wherein as viewed in the longitudinal direction of the light source, the second linear Fresnel refracts the parallel light such that a maximum angle of polarization of light refracted by the second linear Fresnel lens is equal to or smaller than a maximum angle of incidence with respect to an end face of the optical fiber.

2. The pinhole detection device according to claim 1,
wherein the light source is a linear light source that linearly emits light to the object to be inspected,
wherein the optical lens converges light from the light source that is spread in a direction of travel away from the optical axis of the light source such that the light comes closer to the optical axis of the light source,
wherein the detection unit includes a plurality of the optical fibers arranged side by side while facing the light source, and
wherein when a maximum angle of polarization of the optical lens is defined as θ1, the maximum angle of polarization θ1 is set larger than or equal to the maximum detectable angle θ.

3. The pinhole detection device according to claim 2, wherein a maximum angle of incidence of the light that can be transmitted by each of the optical fibers with respect to the optical axis of the light source is included in a range of θ1+0° to θ1+5°.

4. The pinhole detection device according to claim 1, comprising a conveyance device that moves the object to be inspected in a direction perpendicular to a longitudinal direction of the light source and orthogonal to the optical axis of the light source,
wherein an end face of the optical fiber facing the object to be inspected is arranged at a focal position of the optical lens or is arranged nearer to the object to be inspected than the focal position of the optical lens.

* * * * *